United States Patent [19]

Snipp

[11] Patent Number: 5,699,495
[45] Date of Patent: Dec. 16, 1997

[54] POINT-AND-PRINT IN A DISTRIBUTED ENVIRONMENT

[75] Inventor: David B. Snipp, Beckenham, England

[73] Assignee: Microsoft Corporation, Redmond, Wash.

[21] Appl. No.: 703,338

[22] Filed: Aug. 26, 1996

Related U.S. Application Data

[63] Continuation of Ser. No. 597,558, Feb. 2, 1996, abandoned, which is a continuation of Ser. No. 281,739, Jul. 27, 1994, abandoned.

[51] Int. Cl.⁶ ............................................. G06F 3/14
[52] U.S. Cl. ............................... 395/114; 395/115
[58] Field of Search .................................. 395/114, 115, 395/112, 101, 111, 110, 117

[56] References Cited

U.S. PATENT DOCUMENTS

| | | | |
|---|---|---|---|
| 4,698,688 | 10/1987 | Ochi et al. | 358/257 |
| 5,150,454 | 9/1992 | Wood et al. | 395/114 |
| 5,228,118 | 7/1993 | Sasaki | 395/112 |
| 5,268,993 | 12/1993 | Ikenoue et al. | 395/114 |
| 5,287,194 | 2/1994 | Lobiondo | 395/114 |
| 5,287,434 | 2/1994 | Bain et al. | 395/101 |
| 5,325,527 | 6/1994 | Cwikowski et al. | 395/112 |
| 5,371,837 | 12/1994 | Kimber et al. | 395/112 |

OTHER PUBLICATIONS

McClelland, Deke, *Macintosh® System 7.1: Everything You Need To Know*, 2d ed., Sybex Inc., San Francisco, CA, 1992, pp. 106–110, 379, 384–387.

*Primary Examiner*—Raymond J. Bayerl
*Assistant Examiner*—Steven P. Sax
*Attorney, Agent, or Firm*—Seed and Berry LLP

[57] ABSTRACT

A point-and-print capability is provided within a distributed environment. This point-and-print capability enables a user to select any of a number of available printers within the distributed environment via a user interface and then to have a document printed on the selected printer. The underlying loading of drivers and configuration steps are transparent to the user. This transparency is achieved in part by storing key printer resources, including printer drivers, on print servers that are distributed throughout the environment.

26 Claims, 9 Drawing Sheets

| 138 | | 140 | |
|---|---|---|---|
| 142 | JobID | 170 | JobID |
| 144 | pPrinterName | 172 | pPrinterName |
| 146 | pMachineName | 174 | pMachineName |
| 148 | pUserName | 176 | pUserName |
| 150 | pDocument | 178 | pDocument |
| 152 | pDatatype | 180 | pNotifyName |
| 154 | pStatus | 182 | pDatatype |
| 156 | Status | 184 | pPrintProcessor |
| 158 | Priority | 186 | pParameters |
| 160 | Position | 188 | pDriverName |
| 162 | Total Pages | 190 | pDevMode |
| 164 | Pages Printed | 192 | pStatus |
| 166 | Submitted | 194 | pSecurityDescriptor |
| | | 196 | Status |
| | | 198 | Priority |
| | | 200 | Position |
| | | 202 | Start Time |
| | | 204 | Until Time |
| | | 206 | Total Pages |
| | | 208 | Size |
| | | 210 | Submitted |
| | | 212 | Time |
| | | 214 | Pages Printed |

*FIG. 7*

POINT-AND-PRINT IN A DISTRIBUTED ENVIRONMENT

CROSS-REFERENCE TO RELATED APPLICATIONS

This application is a continuation of U.S. patent application No. 08/597,558, filed Feb. 2, 1996, now abandoned, which is a continuation of U.S. parent application No. 08/281,739, filed Jul. 27, 1994, now abandoned.

TECHNICAL FIELD

The present invention relates generally to data processing systems and, more particularly, to printing within a distributed environment.

BACKGROUND OF THE INVENTION

Conventional distributed systems that have permitted the user to print on a remote print device have required a cumbersome amount of work by the user to realize such printing. In general, the user has been given the burden of deciding which printer driver to use and what configuration options need to be set for the printer so as to support the printing on the remote print device. Such a burden has proven to be both difficult, time-consuming and error prone.

SUMMARY OF THE INVENTION

The above-described problems of conventional distributed systems are overcome by the present invention. In accordance with the first aspect of the present invention, a method is practiced in a distributed system having printers, workstations and print servers. The print servers are each responsible for servicing printer requests to a group of printers that are connected to the printer server. In accordance with this method, key printer resources are stored on each print server. The key print resources include printer drivers for the group of printers connected to the print server. The key printer resources at a selected print server are accessed by a workstation when seeking to print a document on one of the printers of the server's group. The accessed key printer resources are then used to print the document on the chosen printer.

In accordance with another aspect of the present invention, a distributed system includes workstations and a print server to service requests to print documents on the printers. The print server includes a memory for storing key printer resources for the printers. These key printer resources include print drivers. The distributed system includes a retrieval mechanism for retrieving the key printer resources for a printer to a selected workstation when the selected workstation requests a printed document on the printer.

In accordance with a further aspect of the present invention, a method is practiced in a distributed system. An operating system is run on one of the workstations of the distributed system, and the operating system receives a request from an application program run on the workstation to print a document on the target printer. The print driver for the target printer is stored on a print server. In response to the request from the application program, a copy of the printer driver is retrieved from the print server to the workstation. The document is then printed on the target printer using the copy of the printer driver that was retrieved from the print server.

A user interface may be provided to allow a user to select which printer within the distributed system is to be used to print a document. Once the user points to such a printer on the user interface, the appropriate steps are taken to enable the user to print a document on the selected printer. These operations are entirely transparent to the user.

BRIEF DESCRIPTION OF THE DRAWINGS

FIG. 7 is a block diagram illustrating the format of job data structures in accordance with the preferred embodiment of the present invention.

DETAILED DESCRIPTION OF THE INVENTION

The preferred embodiment of the present invention provides a point-and-print capability to a user within a distributed environment. This point and print capability allows a user to print a document on a remote printer simply by selecting a printer from a list of print devices that are available to print the document. The underlying steps of configuration that are required to permit the user to print on the remote print device are transparent to the user (i.e., these steps do not require user interaction). In addition, the components of the preferred embodiment of the present invention that provide the point-and-print capability are modularized so that they may be readily replaced with other customized modules.

Figure 1:
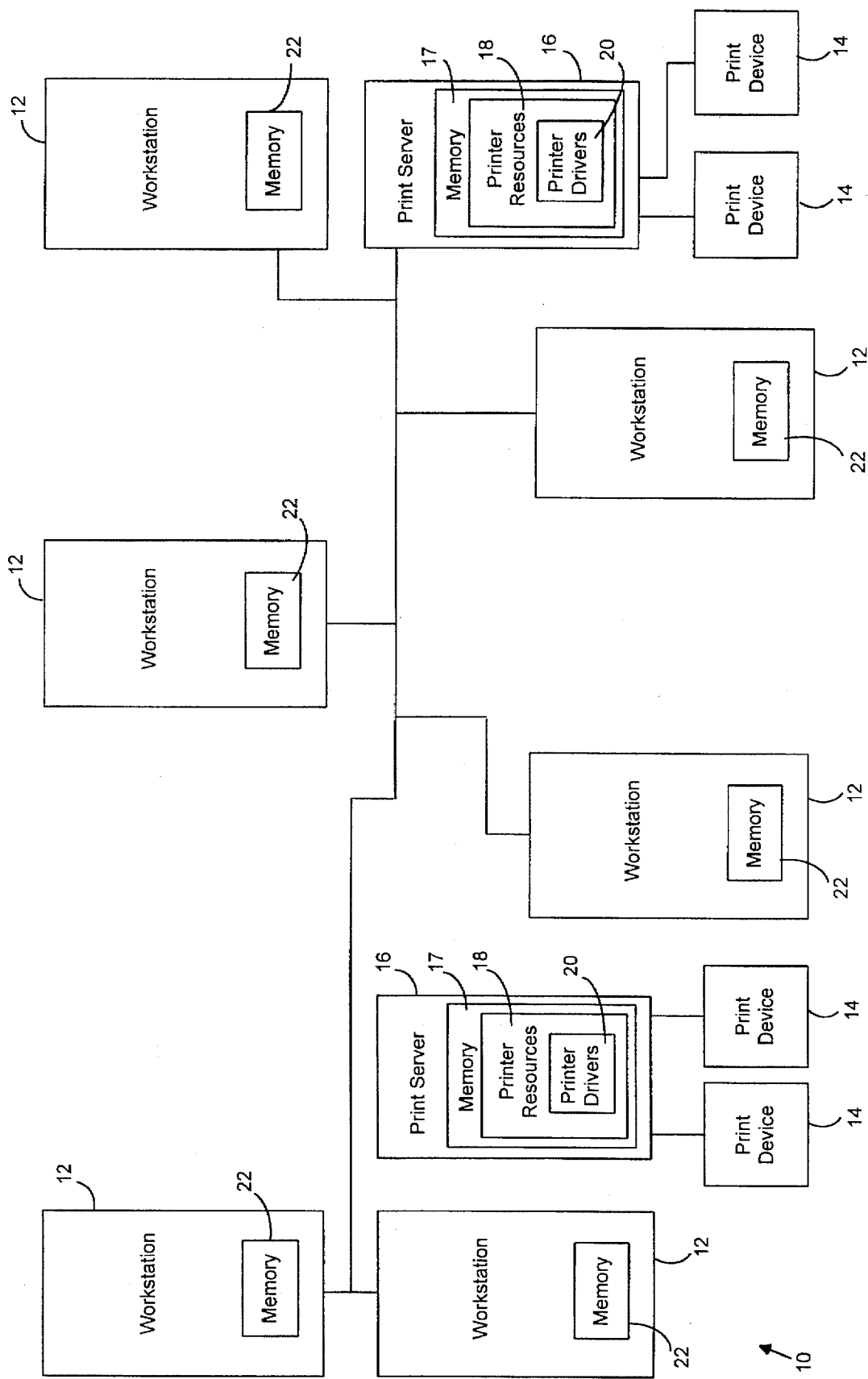
FIG. 1 is a block diagram of a distributed system that is suitable for practicing a preferred embodiment of the present invention.

The preferred embodiment of the present invention is designed to operate in a distributed environment. An example of a distributed system 10 that is suitable for practicing the preferred embodiment of the present invention is depicted in FIG. 1. The distributed system 10 of FIG. 1 includes a number of workstations 12 that each includes a section of memory 22 for holding code and/or data.

The distributed system 10 also includes machines that act as print servers 16. Technically, a print server is a process that runs on these machines to service client requests to use print devices 14. Nevertheless, for purposes of simplicity, the machines that run this process will be referred to below as print servers. Each print server 16 is responsible for managing a predetermined group of print devices 14 that are connected to it. The print devices may be of different types, such as laser printers, dot matrix printers, thermal printers, plotters or other types of printers. The print servers 16 may be dedicated workstations or other suitable computers. Each print server 16 includes a section of memory 17 that holds key printer resources 18.

The key printer resources 18 include printer drivers 20 for the print devices 14 and printer configuration information. In general, the key printer resources contain sufficient information to print on the print devices 14 that are served by the print server 16. The printer configuration information includes information such as how much memory a printer has, what font cartridges a printer has, how many trays a printer has, which forms are in the printer trays. In addition, soft fonts are stored as part of the key printer resource 18. Such soft fonts may be very large and, thus, it is advantageous to store only one copy for the print devices 14 served by the print server 16.

A distributed operating system is run on the distributed system 10. In the preferred embodiment of the present invention, the distributed operating system is the Microsoft WINDOWS NT operating system, sold by Microsoft Corporation of Redmond, Wash. In the embodiment of the present invention described below, this operating system is run on the print servers 16 and the workstations 12. Those skilled in the art will appreciated that such a configuration is merely illustrative and not intended to limit the scope of the present invention.

Those skilled in the art will also appreciate that the distributed system of FIG. 1 is merely illustrative. The present invention may be practiced in other distributed environments that have different configurations. Furthermore, those skilled in the art will appreciate that additional components may be included as part of the distributed system 10. For instance, other input/output devices, such as keyboards, mouses, secondary storage devices and the like, may be included as part of the distributed system 10.

The preferred embodiment of the present invention facilitates the point-and-print capability described above by storing the key printer resources 18 on the print servers 16 rather than locally at the workstations 12 that wish to use the print devices 14. Thus, when an application wishes to use a print device, the appropriate driver may be retrieved from the print server for the print device. As mentioned above, these steps are performed transparently relative to the application and user.

Figure 2:
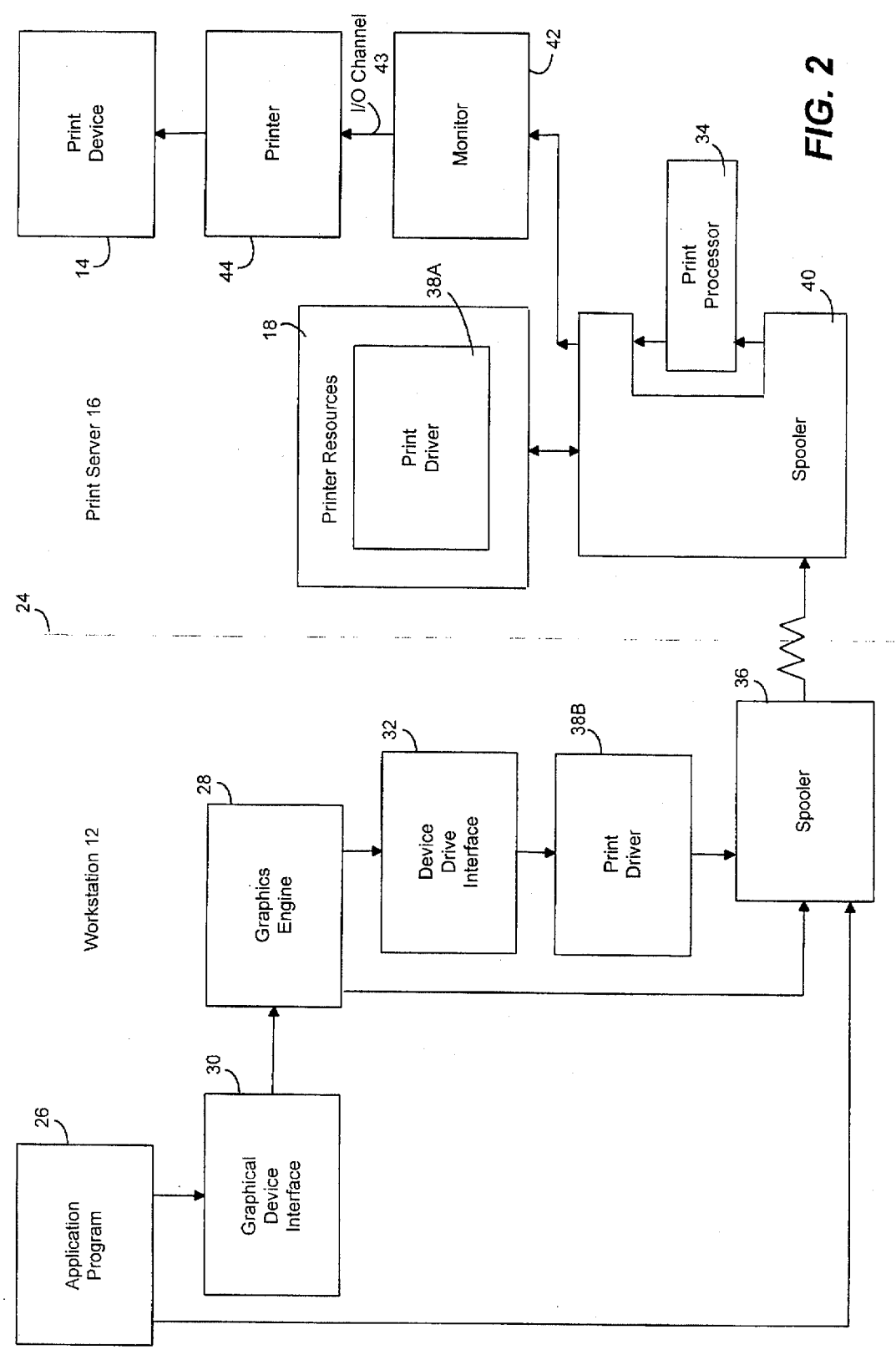
FIG. 2 is a block diagram illustrating the major components that play a role in the printing process of the preferred embodiment of the present invention.

FIG. 2 is a block diagram illustrating the components that play a major role in the printing of a document in the preferred embodiment of the present invention. Boundary 24 in FIG. 2 separates the components of workstation 12 from the components of the print server 16. Among the components of the workstation 12 is an application program 26 that is run therein. The application program 26 is the program that initiates a printing request to print a document on a remote print device 14. The application program 26 may be a word processing program, spreadsheet program or, more generally, any program that is capable of generating a print request.

The graphics engine 28 is a section of code provided by the operating system that is called through a graphical device interface (GDI) 30 by the application program 26. The GDI is a part of the operating system that provides functions that application programs may use to display graphics and formatted text. The graphics engine 28 is responsible for converting GDI calls to device driver interface (DDI) calls. The resulting DDI calls are passed through the DDI 32 to a local copy of a print driver 38B for the print device 14. The local copy of the print driver 38B communicates with the local spooler 36. The graphics engine 28, likewise, communicates with a local spooler process 36. The local spooler 36 and the local copy of the print driver 38B will be described in more detail below. The graphics engine 28 acts as a liaison that mediates between the application program 26 and the components at the device driver level to provide the application program 26 with access to the print device 14. It should also be noted that the application program 26 may directly call the local spooler 36 for some operations.

The local spooler 36 is akin to remote spooler process 40 that runs on the printer server 16. These two spoolers 36 and 40 act in conjunction to schedule print requests. The spoolers 36 and 40 coordinate activity amongst the other components and are responsible for the spooling and printing of print jobs. The print processor 34 is a dynamic link library (DLL) that receives information about data types from the spooler 40, interprets the information and returns the resulting interpretation to the spooler 40. Spooler 40 is configured so that different print processors may be plugged into it. In FIG. 2, a print processor 34 is shown plugged into the spooler 40.

As mentioned above, a local copy 38B of the print driver is maintained at the workstation 12. The print driver serves as an interface that allows the workstation 12 to communicate with the print device 14. The local copy of the print driver 38 is queried to obtain configuration information about the print device 14 and is run to print the document on the print device 14 from the workstation 12.

The print server 16 includes a number of components. As was discussed above, a copy of the print driver 38A that is suitable for communicating with the print device 14 is stored on the print server 16. In addition, spooler 40 is run on the print server 16. Although the print device 14 is shown as being on the side of the print server 16 (as delineated by boundary 24), it should be appreciated that the print device is a separate entity that is not part of the print server. A monitor 42 is provided at the print server to monitor the port leading to the print device 14. The print monitor 42 receives information from the print driver via the spooler 40 and sends the information on to the printer 44 over input/output (I/O) channel 43. The print monitor 42 tracks the physical devices so that the responsibility of such monitoring does not fall upon the spooler 40.

The print device 14 is the hardware device that produces printed output. The printer 44, in contrast, is not a hardware device but rather is a logical construct that acts as a software interface between the application program 26 and the print device 14. The printer 44 is an abstraction that holds certain characteristic information about the print device 14. Given their logical equivalence in many contexts, the terms "print device" and "printer" are often interchangeably in portions of the text below.

Figure 3:
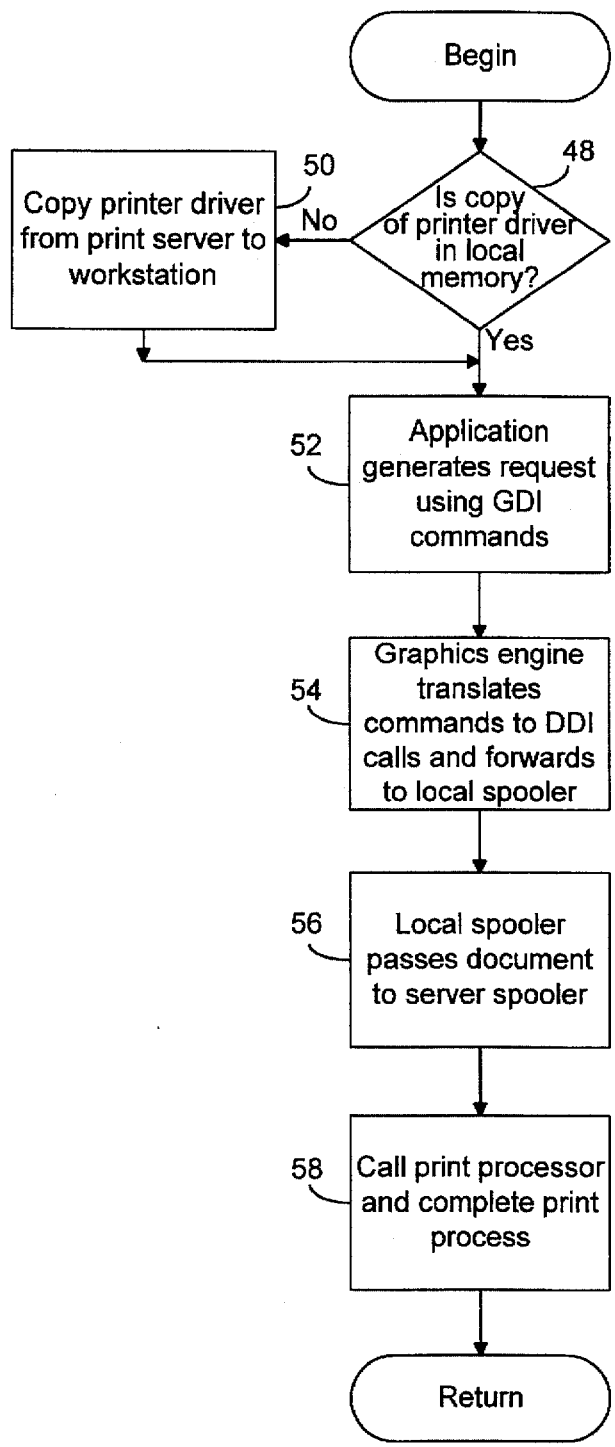
FIG. 3 is a flow chart that provides an overview of the steps performed in the printing process in the preferred embodiment of the present invention.
Figure 4A:
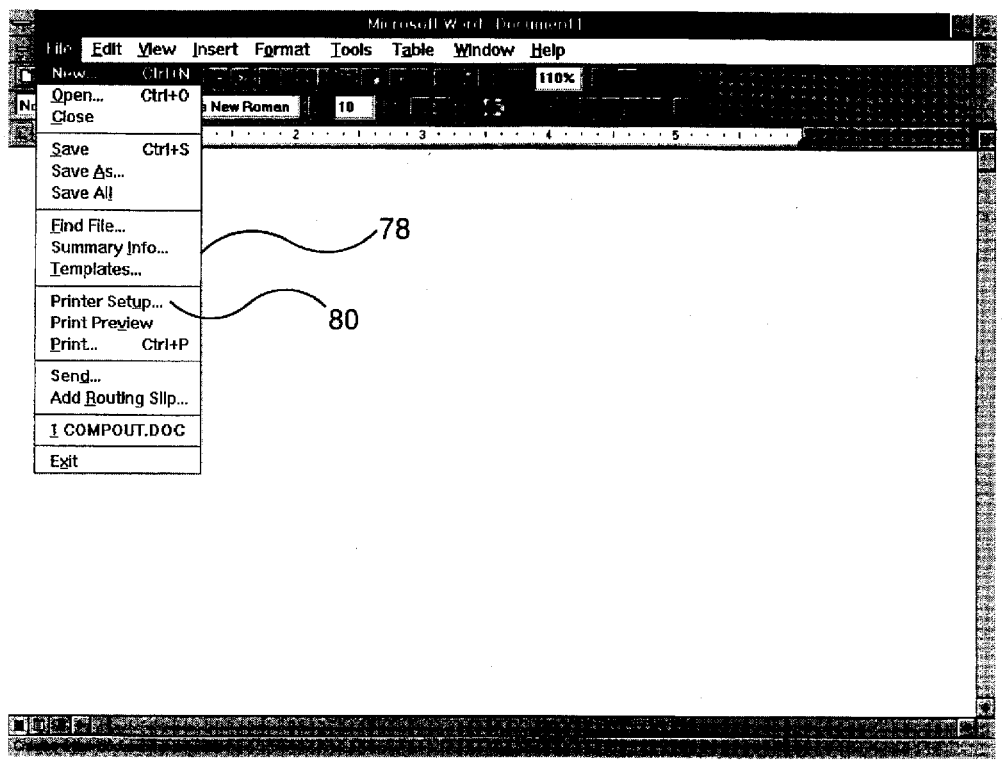
FIG. 4A illustrates a drop-down menu that is provided in an application program in the preferred embodiment of the present invention.
Figure 4B:
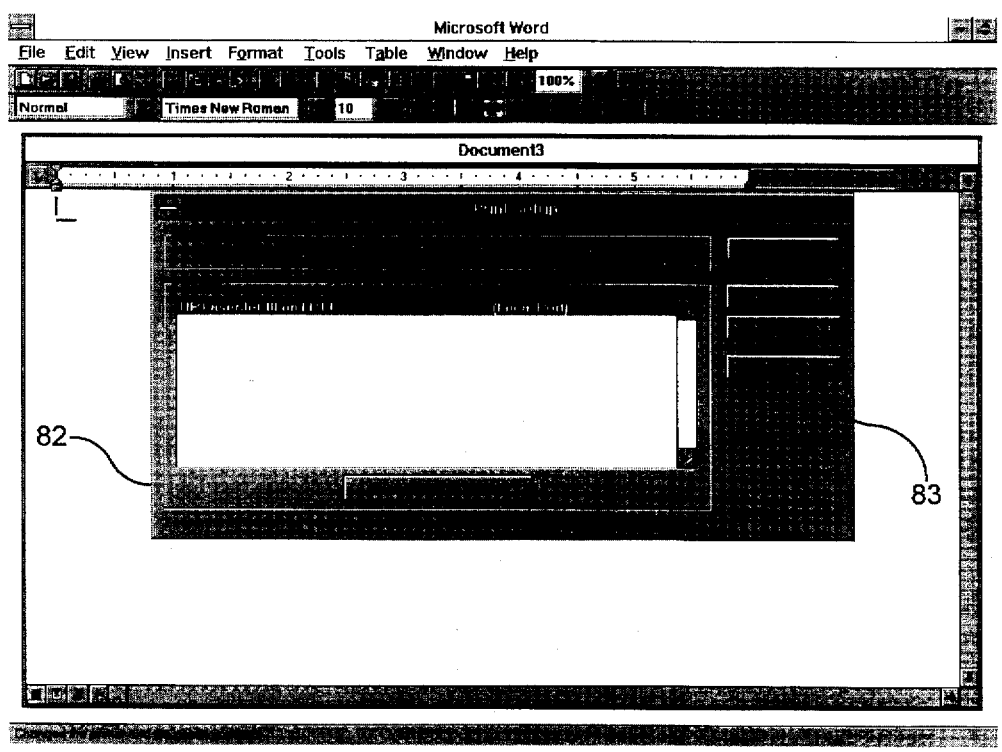
FIG. 4B illustrates a print setup dialog that is used in the preferred embodiment of the present invention.

FIG. 3 is a flow chart that provides an overview of the steps that are performed by the components of FIG. 2 when the application program 26 requests to print a document on print device 14. The application program 26 allows the user to select a printer. In a first example case, a file menu 78 (FIG. 4A) is provided that includes a print option 80. When the print option 80 is selected, a print dialog box is shown that includes a printer button. When the printer button is activated, a print setup dialog box 60 is displayed (FIG. 4B). The print setup dialog box includes a network button 83. When the network button 83 is activated, a connect network printer dialog box 79 (FIG. 4C) is presented that includes a list box 81 of printers. The user may select one of the printers in the list box 81 to print on one of the network printers.

Figure 4C:
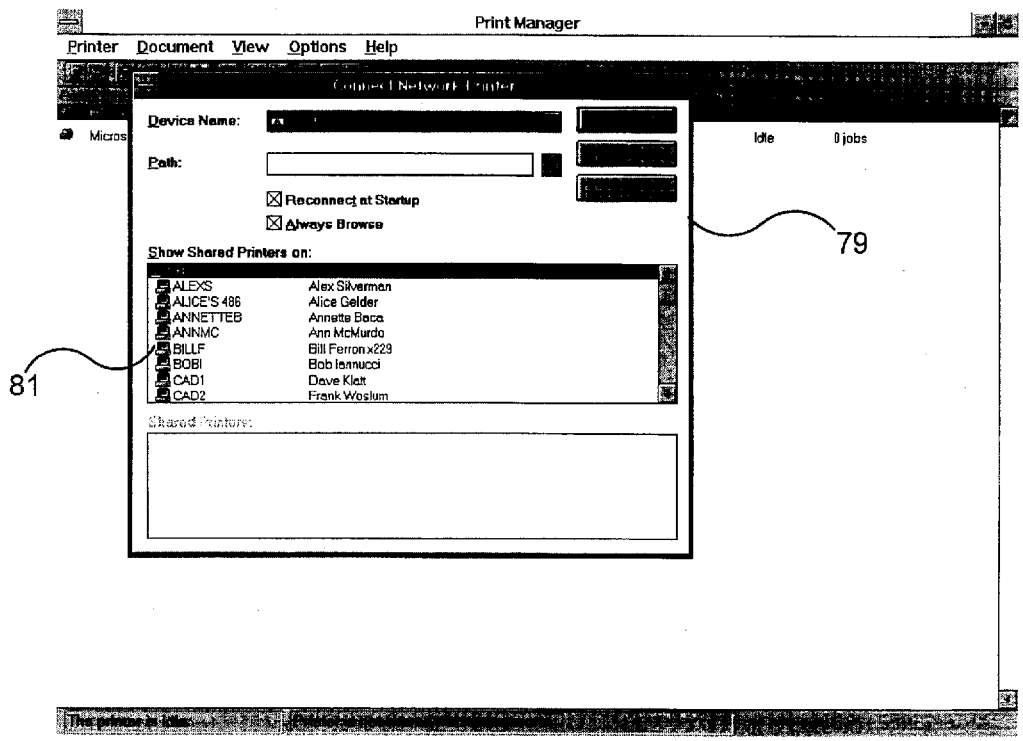
FIG. 4C illustrates a connect network printer dialog that is provided in the preferred embodiment of the present invention.
Figure 5A:
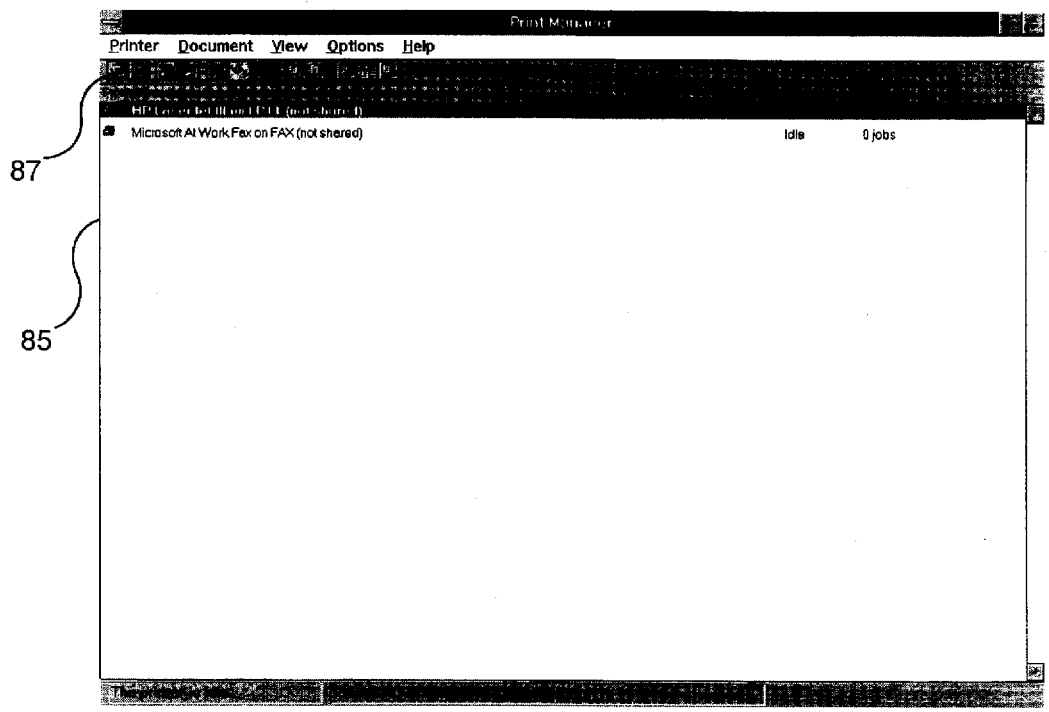
FIG. 5A illustrates a connect network printer button within a print manager window in accordance with the preferred embodiment of the present invention.
Figure 5B:
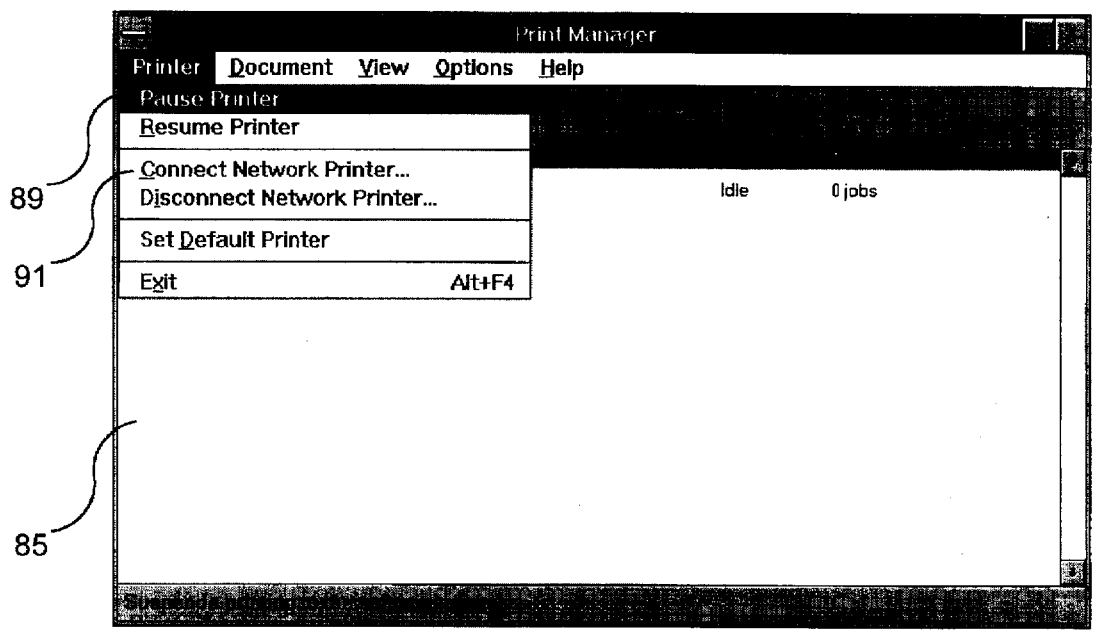
FIG. 5B illustrates a printer menu that includes a connect network printer option in accordance with the preferred embodiment of the present invention.

A second way the user may select a printer to print the print job on is to activate button 87 (FIG. 5A) that is provided in the print manager window 85. The print manager is provided as part of the operating system that is run on the workstations 12. The print manager is also provided on the print servers 16 to configure print devices 14 on the server. When button 87 is activated, the dialog 79, shown in FIG. 4C, is presented to the user. The user then uses the dialog 79 to select the printer to which the print job is to be sent. A third approach to selecting the printer is also accessible from within the print manager window 85. A user may select the printer option 89 (FIG. 5B) on the menu bar of the window to display a menu of options. One of the options that is then presented is a "connect network printer" option 91. When option 91 is selected, dialog 79 (FIG. 4C) is displayed.

Initially, it is determined whether a local copy of the print driver 38B is held in the local memory of the workstation 12 (FIG. 2) from which the print request originates (step 48 in FIG. 3). If a local copy of the print driver 38B is not present, the print driver 38A at the print server 16 is copied to the workstation 12 (step 50 in FIG. 3). As was discussed above, the print drivers 20 (FIG. 1) are stored at the print server 16 rather than at the local workstations 12 so as to facilitate the point-and-print capability. The printer server 16 may hold copies of print drivers for different version of the operating system or even for different operating systems. The print server selects the version of the print driver that is appropriate for the version of the operating system that is running at the requesting workstation. Moreover, the workstations 12 may employ different processors and, thus, require different print drivers. The print server determines the print driver that is appropriate for the processor in the workstation that requested the driver.

The AddPrinter() function is provided by the operating system to add a print device to the list of print devices supported by a print server. The GetPrinter() function is provided to enable the system to determine which print driver to use, and the GetPrinterData() function is provided for a device driver to remotely obtain configuration information. Thus, the print server 16 acts as a known location where all key printer resources 18 may be found by an application program that wishes to print a document on a remote print devices 14.

The application program 26 (FIG. 2) then generates a description of the requested output using GDI commands (step 52 in FIG. 3). The GDI commands specify information about the content and formatting of the document, but do not tell the print device 14 how to print the document. A device context is a data structure maintained by the GDI 30 that is associated with a particular device. The device context structure holds attributes about a device that are used in conjunction with GDI functions. Before the application program can interact with the printer 44, the application program must call a function that creates a device context for the printer. The application program may call an application program interface (API) like DeviceCapabilities to discover device attributes. In addition, the GDI may query the device via DDI to discover device attributes. The parameters for this function are a fully qualified printer name and a DerMode structure. The DerMode structure holds the user's choice of printer options, such as the number of copies, orientation, form and the like. Each print device 14 has a default DerMode structure that is assigned to documents that are printed by the print device and that does not specify other DerMode structures. These DerMode structures provide information about the form to be used when the document is printed on the print device.

The GDI commands are received at the graphics engine 28, converted into DDI calls and forwarded through the DDI 32 to the spooler 36 at the workstation 12 (step 54 in FIG. 3). The DDI calls pass through the local copy of the print driver 38B in reaching the client spooler 36.

The spooler 36 passes the document to spooler 40 (step 56 in FIG. 3). The spooler 40 then passes the document to print processor 34 that performs any rendering that is necessary. The print processor processes the data and returns it to the spooler 40 that handles the print request like any other print request (step 58). The print processor 34 and spooler 40 use the printer resources 18 stored at the print server 16.

Figure 6:
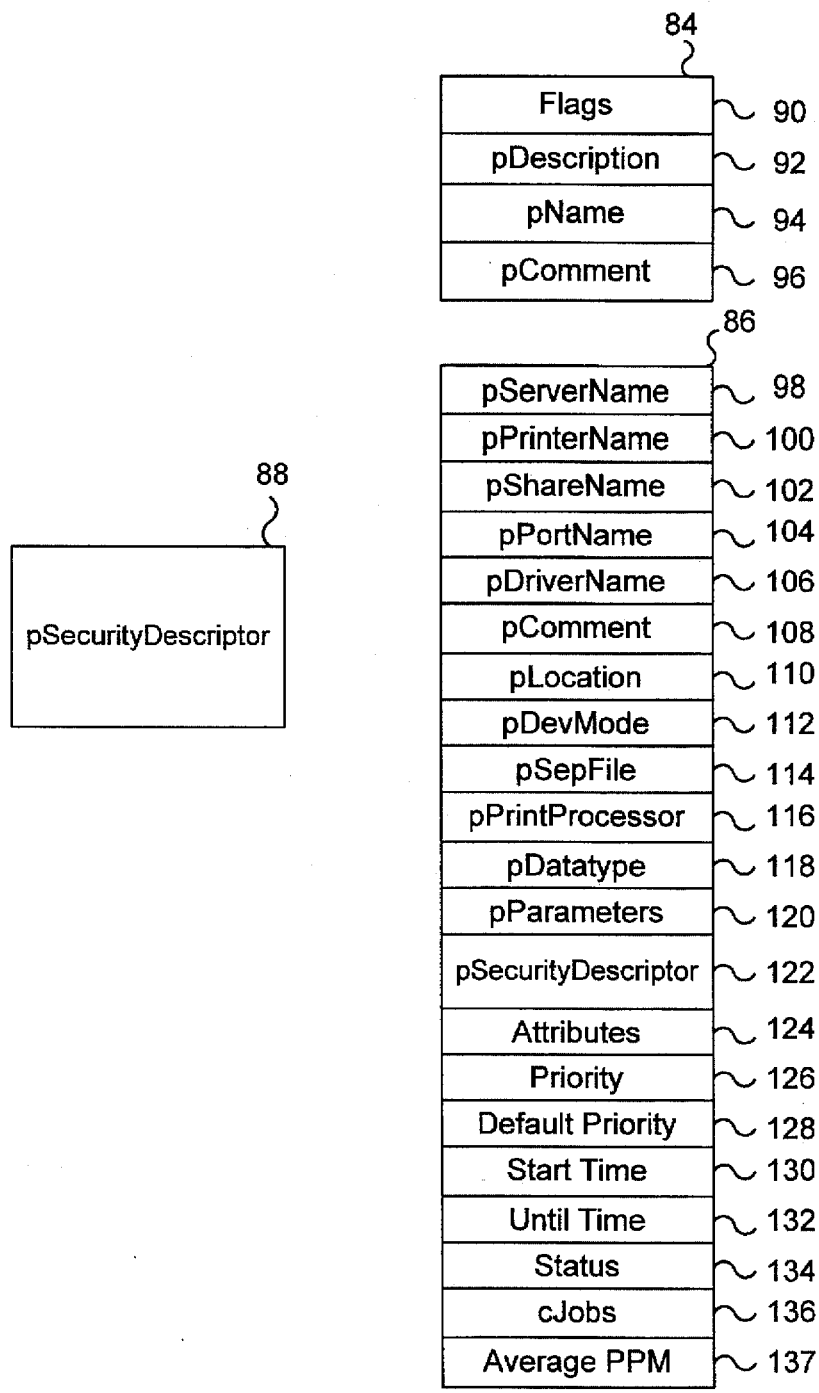
FIG. 6 is a block diagram illustrating the format of pointer data structures in accordance with the preferred embodiment of the present invention.

A number of data structures play a role in the above-described process of printing a document in the preferred embodiment of the present invention. These data structures are built and stored in the printer resources 18 to support the point and printer capability of the preferred embodiment of the present invention. FIG. 6 depicts the three data structures 84, 86, and 88 that are maintained for each printer within the distributed system. The first data structure 84 specifies general printer information. This data structure 84 includes four fields: Flags field 90, pDescription field 92, pName field 94, and pComment field 96. The Flags field 90 is used to hold certain flag values. The pDescription field 92 holds a pointer to a string that describes the contents of the structure. The pName field 94 holds a pointer to a string that names the contents of the structure, and the pComment field 96 holds a pointer to a string that contains additional information describing the structure.

The second printer data structure 86 specifies more detailed printer information. This data structure 86 holds a much larger number of fields. For purposes of completeness, each of these fields will be described in more detail below.

A pServerName field 98 holds a pointer to a string that identifies the server that controls the printer. A pPrinterName field 100 holds a pointer to a string that specifies the name of the printer. A pShareName field 102 holds a pointer to a string the identifies share point for the printer. A pPortName field 104 holds a pointer to a string that identifies the port or ports that are used to transmit data to the printer. A pDriverName field 106 holds a pointer to a string that specifies the name of the print driver that is used for the printer. A pComment field 108 holds a pointer to a string that provides a description of the printer.

A pLocation field 110 holds a pointer to a string that identifies the physical location of the printer within the distributed system. A pDevMode field 112 holds a pointer to a DerMode structure that defines the printer data such as paper orientation and resolution. A pSepFile field 114 holds a pointer to a string that specifies the name of the file that is used to create a separator page. A pPrintProcessor field 116 holds a pointer to a string that specifies the name of the print processor that is used by the printer. A pDatatype field 118 holds a pointer to a string that specifies the data type that is used to record the print job. A pParameters field 120 holds a pointer to a string that specifies default print processor parameters. A pSecurityDescriptor field 122 holds a pointer to a security descriptor structure for the printer.

An attributes field 124 specifies certain printer attributes. A priority field 126 specifies a priority value that the spooler uses to route print jobs. A default priority field 128 specifies the default priority value that is assigned to each print job. A StartTime field 130 specifies the earliest time at which the printer may print a job. An UntilTime field 132 specifies the latest time at which the printer may print a job. A status field 134 specifies the current status of the printer. A cJobs field 136 specifies the number of print jobs that have been queued for the printer. Lastly, an AveragePPM field 137 specifies the average number of pages per minute (PPM) that have been printed on the printer.

The third printer data structure 88 is used to hold printer security information. It includes a single field: pSecurityDescriptor. This field holds a pointer to a security descriptor structure that specifies the printer security information.

The operating system also provides a number of functions for manipulating these data structures 84, 86, and 88. One such function, that was briefly discussed above, is the AddPrinter() function. The AddPrinter() function adds a printer to the list of supported printers for a specified print server. Among the parameters of this function are the address of the print server and the address of the second data structure 86 that holds the information for this printer for the printer that is to be added.

Another function that utilizes the data structures 84, 86, and 88 is the GetPrinter() function that retrieves data for a printer. Among the parameters specified for this function is a handle (i.e., a numerical identifier) for the printer of interest. Other parameters include an indicator that specifies which of the three data structures 84, 86, and 88 is to be accessed and a parameter that specifies a pointer to an array of bytes that has received the information stored in the identified data structure.

A SetPrinter() function is provided to "set" a printer by pausing, resuming printing, or clearing all print jobs. In addition, the SetPrinter() function may be used to set certain printer data. A first parameter of this function identifies the handle of the printer that is to be set. The address of the array containing the printer data is also passed as a parameter to the SetPrinter(). Another parameter of this function specifies a printer's state command. The state command specifies a command to pause the printer, delete all print jobs for the printer, or resume a paused printer. To modify the current printer settings, an application calls the GetPrinter() function to retrieve the current settings in the second data structure 86. The application then modifies the fields of that structure as needed and calls the SetPrinter() function.

As is mentioned in the discussion above, printing tasks are scheduled as jobs. Data structures are maintained to hold information about each job that is en queued in a print queue by the spooler. FIG. 7 shows two data structures 138 and 140 that holds the job data.

The first job data structure 138 holds a JobId field that holds the JobId for the print job. A pPrinterName field 144 holds a pointer to a string that specifies the name of the printer for which the job is spooled. The pMachineName field 146 holds a pointer to a string that specifies the name of the machine that created the print job. Thus, for example, when a workstation originates a print request, the pMachineName field 146 holds the name of the workstation that originated the request.

A pUserName field 148 holds a pointer to a string that specifies the name of the user that owns the print job. A pDocument field 150 points to a string that specifies the name of the print job. A pDatatype field 152 holds a pointer to a string that specifies the type of data that is used to record the print job. A pStatus field 154 holds a pointer to a string that specifies the status of the print job. A status field 156 specifies the job status. Among the values that this field may assume are deleting, error, off-line, paper route, pause, printed, printing, or spooling values.

A priority field 158 specifies the job priority as a numerical value. A position field 160 specifies the job's position in the print queue. A TotalPages field 162 specifies the number of pages contained in the document, and a PagesPrinted field 164 specifies the number of pages that have been printed. Lastly, a submitted field 166 specifies the time at which the document was spooled.

A second job data structure 140 holds a complete set of values associated with the job. The second data structure 140 holds a JobId field 170, a pPrinterName field 172, a pMachineName field 174, a pUserName field 176, a pDocument field 178, a pDatatype field 182, a pStatus field 192, a status field 196, a priority field 198, a position field 200, a TotalPages field 206, a PagesPrinted field 214, and a submitted field 210 like those present in the first data structure 138. The second data structure, however, includes additional fields that hold information.

A first of these additional fields is a pPrintProcessor field 184 that holds a pointer to a string that specifies the name of the print processor that should be used to print the job. Another of the additional fields is a pParameter field 186. The pParameter field holds a pointer to a string that specifies print processor parameters. The second job data structure 140 also holds a pDriverName field 198 that holds a pointer to a string that specifies the name of the printer driver that should be used to process the job. The second job data structure 140 also includes a pDevMode field 190 that holds a pointer to a DerMode structure that is to be used by the printer driver.

A PSecurityDescriptor field 194 is also included in the second data structure 140. This field 194 holds a pointer to a security descriptor structure or assumes a null value. The second data structure 140 further includes a StartTime field 202 and an UntilTime field 204. The StartTime field 202 specifies the earliest time at which a job may be printed, whereas the UntilTime field 204 specifies the latest time at which a job may be printed. Lastly, the second data structure 140 holds a size field 208 and a time field 212. The size field 208 specifies the size of bytes that the job and the time field 212 specifies the total time elapsed since the job began printing.

The operating system provides a number of functions to manipulate these job data structures 138 and 140. One such function is the GetJob() function that retrieves print job data for a specified printer. The parameters to this function include the handle to the printer, a JobId value, an identifier of which of the two data structures 138 or 140 is to be accessed, and a pointer to the array that contains the specified data structure. Hence, by using the GetJob() function, a calling party may retrieve information held within one of the data structure 138 or 140 that is maintained for a specified job and printer.

A job may be added to a print queue by calling the AddJob() function. The parameters for this function specify the printer 44, the data structure 138 or 140 that is to be used and an address of the data structure that is to be used.

The operating system also provides a SetJob() function. The SetJob() function is roughly analogous to the SetPrinter() function. Specifically, the SetJob() function pauses, resumes, cancels, or restarts a specified print job on a given printer. The function may also be used to set print job parameters. The parameters for this function include a handle of the printer, a JobId, an identification of the affected data structure 138 or 140, and a job command value. A job command value indicates whether a cancel, pause, restart, or resume is to be performed when the function is executed.

The spooler is responsible for scheduling these jobs that are queued in the print queue. The operating system provides a ScheduleJob() function. The ScheduleJob() function informs the spooler that the specified job can be scheduled for printing. The parameters for this function include the handle of the printer and a JobId.

In order to understand the role served by the spoolers, it is helpful to further investigate the inner workings of the spoolers. Each spooler process has many threads of execution. In particular, one thread is provided for each local physical port for which the spooler process is responsible. In addition, the spooler process provides a scheduler thread that is responsible for coordinating and synchronizing printer threads. The scheduler thread is awoken whenever an existing print job changes, whenever a new job is spooled, whenever the state of a printer changes, or whenever a new printer is added. Port threads are awoken by the scheduler thread. The port thread checks whether it should terminate or whether it should print a specified document. The port thread is responsible for shipping data to the print monitor.

A spooler of the operating system provides a number of functions that assist the graphics engine 28 in communicating with printer 44. The OpenPrinter() function is an example of such a spooler provided function. The OpenPrinter() function retrieves a handle that identifies the printer or print server specified within the parameters of the function. The parameters to the function include the address of a printer or print server, the address of the printer or print server handle and the address of a printer default structure. The spooler also provides a WritePrinter() function that informs the spooler that data identified in the parameters should be written to the printer that is identified in the parameters. The parameters specify the handle of a printer object and the address of an array that holds printer data. The spooler also provides a ReadPrinter() function, that retrieves data from a given printer. The parameters for the ReadPrinter() function include the handle of the printer object and an address of an array of memory locations for receiving the data that is read.

The spooler provides the StartDocPrinter() function that informs the spooler that a document is to be spooled for printing. In making a call to this function, a program identifies the printer that is to perform the printing and a pointer to a data structure that holds information about the document that is to be printed. The function returns if identifier of the print job is successful; otherwise, the function returns to zero. The spooler additionally provides an EndDocPrinter() function that ends a print job that is currently printing for a printer that is identified in the parameters.

Lastly, the spooler provides a ClosePrinter() function. The ClosePrinter() function closes a given printer 44 that is identified in the parameters passed function.

The operating system provides additional functions for manipulating print drivers. The AddPrintDriver() function adds a print driver to a print server. In addition, the function links configuration data in driver files. The AddPrintDriver() function has three parameters. The first parameter is a pointer to a string that specifies the name of the print server in which the driver is to be installed. When the driver is to be installed locally, the string has a null value. Another parameter is a pointer to a data structure holding information about the print driver. The DeletePrintDriver() function removes the specified print driver from the list of drivers supported by a specified server. The GetPrinterDriver() function is provided to obtain driver data that is held within the data structure for the print driver.

The operating system also provides functions for manipulating the print processor 34. The AddPrintProcessor() function installs a print processor on a specified server and adds the print processor name to an internal list of supported processors. The DeletePrintProcessor() function removes the print processor from the list that is provided at the server. A GetPrintProcessorDirectory() function is provided to retrieve the path for the print processor from a specified server. Similar add and delete functions are provided for the print monitor 42 and for ports.

The discussion relative to FIG. 3 provides a high-level description of the roles of respective components during the printing process. The discussion below will provide a more detailed discussion of the steps that are performed during an example printing process.

Figure 8:
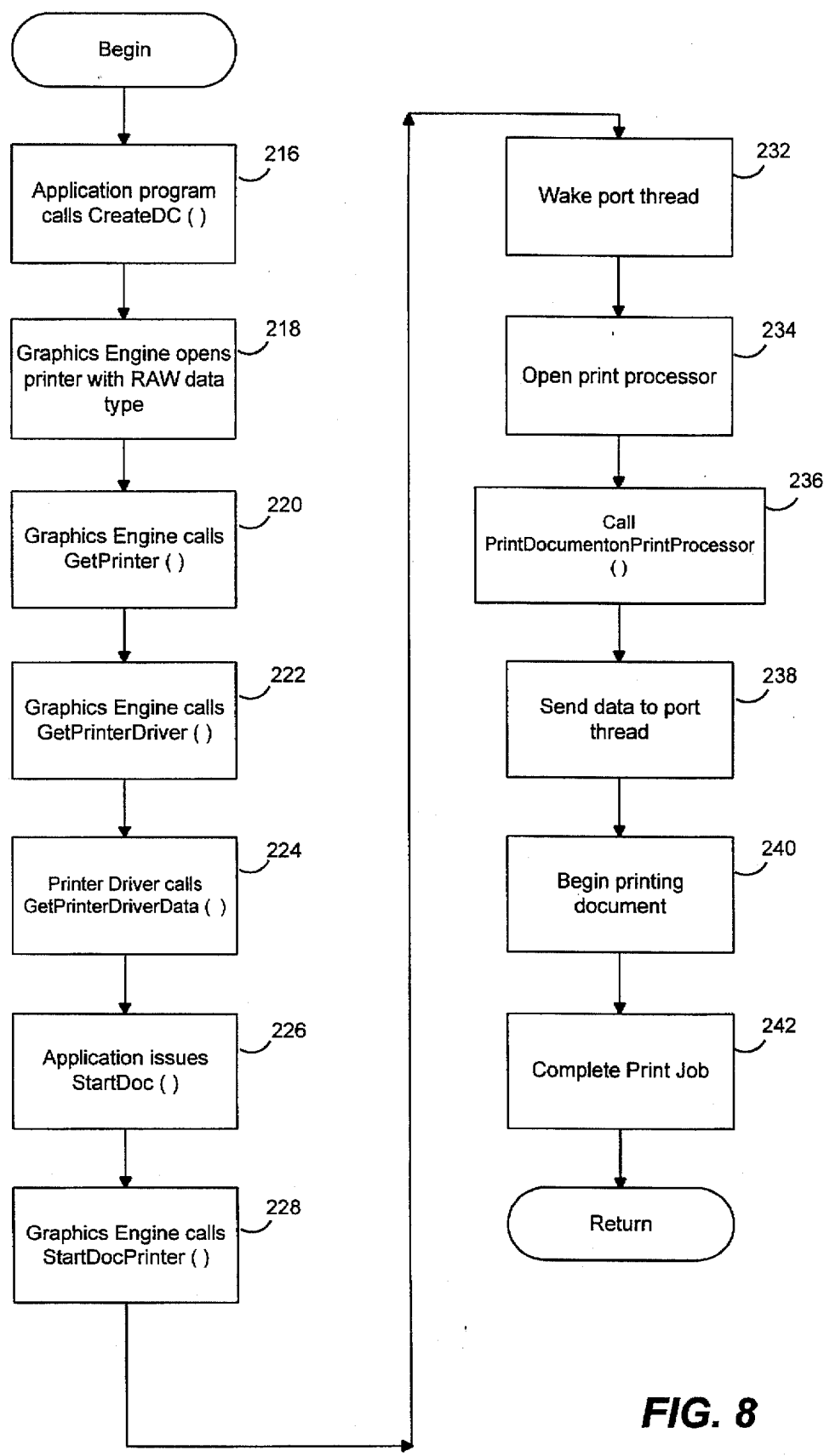
FIG. 8 is a detailed flow chart illustrating the steps performed by the preferred embodiment of the present invention in handling a direct printer request.

Suppose that an application program 26 wishes to print a document directly to a print device 14, the steps shown in the flow chart of FIG. 8 are performed. The application program 26 creates a device context by calling the CreateDC() function (step 216 in FIG. 8). The graphics engine 28 (FIG. 2) then opens printer 44 with the raw data type by calling the OpenPrinter() function (step 86 in FIG. 8). the OpenPrinter function retrieves a handle that identifies the printer 44.

The graphics engine 28 calls the GetPrinter() function to determine which print driver to use (step 220 in FIG. 8). The graphics engine 28 next calls the GetPrinterDriver() function to retrieve a fully qualified path name of where the printer driver physically resides (step 222). The printer driver then calls the GetPrinterDriverData() function to retrieve configuration information about the printer (step 224).

Once the designated driver has been loaded, it may call the GetPrinterDriverData() function to obtain configuration information. The driver also calls the GetPrinterDriver() function to determine which configuration file to use. These operations are performed as a result of the application calling the CreateDC() function discussed above.

The application program 26 issues a call to a StartDoc() function that announces that a document with a name specified in the parameters of the call is to be printed (step 226 in FIG. 8). The StartDoc() function returns a job identifier for the job of printing the specified document. As a result of the application program 26 issuing the StartDoc() call, the graphics engine 28 calls the function StartDocPrinter() (step 228 in FIG. 8). This function adds a job to encapsulate the printing task and to be scheduled by the client spooler 36.

The port thread of the spooler 40 is awoken (step 232 in FIG. 8), and the port thread opens the print processor 34 by calling the OpenPrintProcessor() function (step 234 in FIG. 8). A call is then made to the PrintDocumentPrintProcessor() function (step 236 in FIG. 8), which performs a number of steps that allow the port thread to receive data (step 238 in FIG. 8). The port thread then iteratively sends the data to the print device 14 (step 240), where the document is printed (step 242). This process continues until the print job is completed (step 110).

While the present invention has been described with reference to a preferred embodiment thereof, those skilled in the art will appreciate that various changes in form and detail may be made without departing from the present invention as defined in the appended claims.

I claim:

1. In a distributed system having workstations and printers, a method comprising the steps of:

providing a print server, said print server being responsible for managing printing requests to the printers;

storing printer drivers on the print sewer for the printers for which the print server is responsible for managing printing requests;

generating a printing request to print a document on a destination printer at a requesting workstation, that is one of the workstations of the distributed system, said destination printer not yet being installed at the requesting workstation;

forwarding a key printer resource comprising a copy of a printer driver for the destination printer from the print server to the requesting workstation; and using the forwarded key printer resource that comprises the copy of the printer driver at the requesting workstation to install the destination printer and to print the document on the destination printer.

2. The method of claim 1, further comprising the step of, before the step of using the forwarded key printer resource, spooling the document to a file.

3. The method of claim 1, further comprising the step of providing a user interface that allows a user to select the destination printer among the printers to print the document.

4. The method of claim 1 wherein the step of using the forwarded key printer resource further comprises the step of converting the document into a data type that is acceptable to the destination printer.

5. The method of claim 6 wherein the subset of printers includes printers of different types.

6. The method of claim 1 wherein the step of using the key printer resource further comprises the steps of querying the forwarded copy of the printer driver to obtain information about the printer driver of the destination printer and using the obtained information in printing the document at the destination printer.

7. The method of claim 1 wherein the step of storing printer drivers on the print server comprises the step of storing printer drivers that are compatible with different operating systems on the print server for the printers for which the print server is responsible for managing print requests.

8. The method of claim 1 wherein the step of storing printer drivers on the print server comprises the step of storing a first print driver that is compatible with a first version of the operating system and a second print driver that is compatible with a second version of the operating system on the print server for at least one of the printers for which the print server is responsible for managing print requests.

9. A distributed system, comprising:
workstations;
printers connected to a print server;
a print server for servicing requests to print documents on the printers, said print server comprising a memory for storing key printer resources for the printers wherein said key printer resources include printer drivers; and
a retrieval mechanism for retrieving the key printer resources from the print server for a desired one of the printers and for storing the key printer resources on a selected one of the workstations to install the desired printer at the selected workstation when the selected workstation requests to print a document on the desired one of the printers and the desired one of the printers is not yet installed at the selected workstation, wherein the retrieved printer resources include a printer driver for the desired one of the printers.

10. In a distributed system having workstations, printers and a print server, a method comprising the steps of:

running an operating system on a selected one of the workstations;

receiving at the operating system a request from an application program run on the selected workstation to print a document on a target one of the printers, wherein the target printer is not yet installed at the selected workstation;

storing a printer driver for the target printer on the print server;

via the operating system, in response to the request from the application program, retrieving a key printer resource comprising a copy of the printer driver for the target printer from the print server to the selected workstation and installing the printer driver for the target printer at the selected workstation; and printing the document on the target printer using the key printer resource that comprises the copy of the printer driver that was retrieved from the print server.

11. The method of claim 10, further comprising the step of spooling the document in a file before printing the document.

12. The method of claim 10, further comprising the step of converting the document into a data type that is acceptable to the target printer.

13. The method of claim 10, further comprising the step of, via the operating system, providing a user interface that enables a user to select the target printer among a choice of printers to print the document.

14. In a distributed system having workstations and printers and a printer server that is responsible for managing printing requests to the printers wherein printer drivers for the printers are stored at the print server, a computer-readable storage medium holding instructions for performing a method comprising the steps of:

receiving a printing request to print a document on a destination printer at a requesting workstation, that is one of the workstations of the distributed system, said destination printer not yet being installed at the requesting workstation;

forwarding a key printer resource comprising a copy of a printer driver for the destination printer from the print server to the requesting workstation; and using the forwarded key printer resource that comprises the copy of the printer driver at the requesting workstation to install the destination printer and to print the document on the destination printer.

15. The computer-readable storage medium of claim 14 wherein the method further comprises the step of, before the step of using the forwarded key printer resource, spooling the document to a file.

16. The computer-readable storage medium of claim 14 wherein the method further comprises the step of providing a user interface that allows a user to select the destination printer among the printers to print the document.

17. The computer-readable storage medium of claim 14 wherein the step of using the forwarded key printer resource further comprises the step of converting the document into a data type that is acceptable to the destination printer.

18. The computer-readable storage medium of claim 14 wherein the subset of printers includes printers of different types.

19. The computer-readable storage medium of claim 14 wherein the step of using the forwarded key printer resource further comprises the steps of querying the forwarded copy of the printer driver to obtain information about the printer driver of the destination printer and using the obtained information in printing the document at the destination printer.

20. The computer-readable storage medium of claim 14 wherein the step of storing printer drivers on the print server comprises the step of storing printer drivers that are compatible with different operating systems on the print server for the printers for which the print server is responsible for managing print requests.

21. The computer-readable storage medium of claim 14 wherein the step of storing printer drivers on the print server comprises the step of storing a first print driver that is compatible with a first version of the operating system and a second print driver that is compatible with a second version of the operating system on the print server for at least one of the printers for which the print server is responsible for managing print requests.

22. In a distributed system having workstations, printers and a print server wherein an operating system is run on a selected one of the workstations, a computer-readable storage medium holding instructions for performing a method comprising the steps of:

receiving at the operating system a request from an application program run on the selected workstation to print a document on a target one of the printers, wherein the target printer is not yet installed at the selected workstation;

storing a printer driver for the target printer on the print server;

via the operating system, in response to the request from the application program, retrieving a key printer resource comprising a copy of the printer driver for the target printer from the print server to the selected workstation and installing the printer driver for the target printer at the selected workstation; and printing the document on the target printer using the key printer resource that comprises the copy of the printer driver that was retrieved from the print server.

23. The computer-readable storage medium of claim 22 wherein the method further comprises the step of spooling the document in a file before printing the document.

24. The computer-readable storage medium of claim 22 wherein the method further comprises the step of converting the document into a data type that is acceptable to the target printer.

25. The computer-readable storage medium of claim 22 wherein the method further comprises the step of, via the operating system, providing a user interface that enables a user to select the target printer among a choice of printers to print the document.

26. A distributed system, comprising:

workstations for running programs;

printers for printing documents;

print servers for servicing requests to print documents on the printers, each said print server servicing requests to print documents on a group of the printers that are connected to the print server and each print server including storage for storing key printer resources comprising printer drivers for the printers of its group of printers; and a transport mechanism for transporting a key printer resource which comprises one of the printer drivers for a destination printer that is one of the printers from the print server on which it is stored to a selected workstation when the selected workstation requests to print a document on the destination printer to install the printer driver for the destination printer at the selected workstation.

* * * * *